Figure 1:
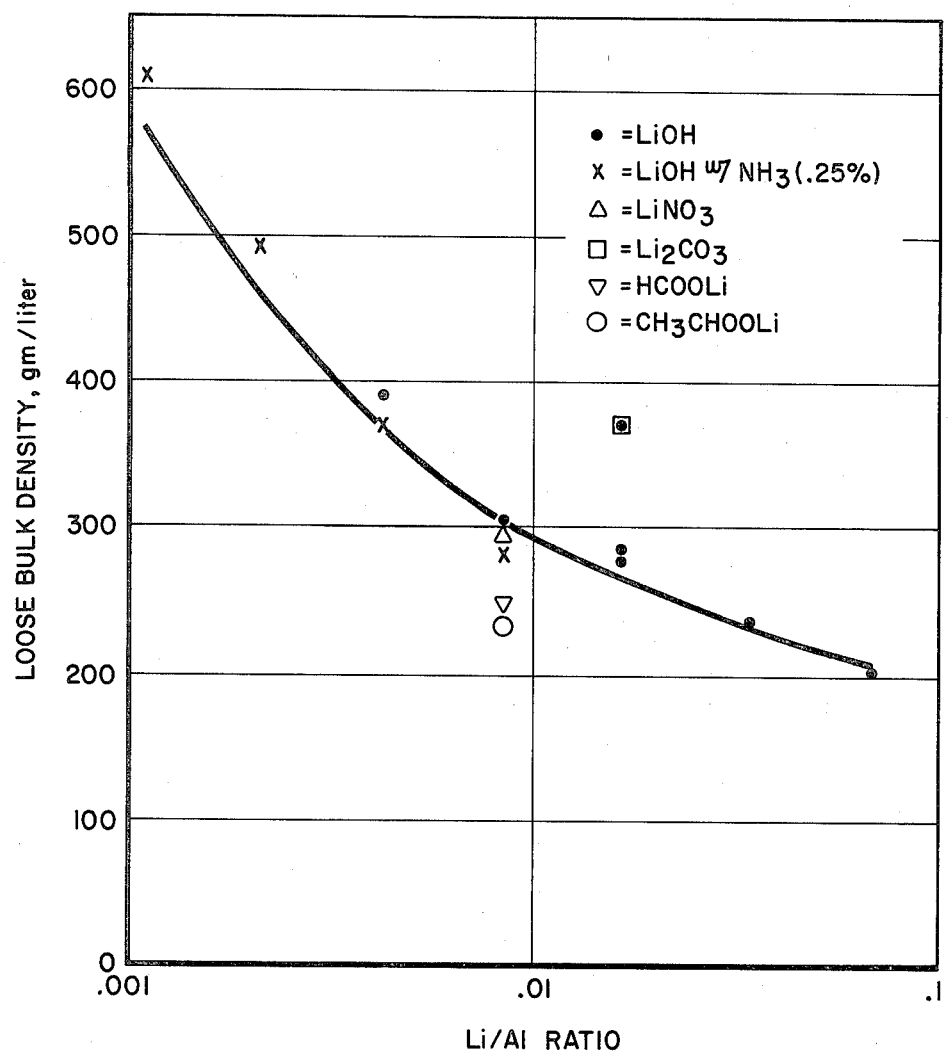

United States Patent [19]

Bendig et al.

[11] 4,177,251

[45] Dec. 4, 1979

[54] PRODUCTION OF LOW LOOSE BULK DENSITY ALUMINA

[75] Inventors: Larry L. Bendig, Ponca City; Donald E. Stowell, Oklahoma City, both of Okla.; Laura A. Starks, New Orleans, La.

[73] Assignee: Conoco, Inc., Ponca City, Okla.

[21] Appl. No.: 954,042

[22] Filed: Oct. 23, 1978

[51] Int. Cl.$^2$ .............................................. C01F 7/02
[52] U.S. Cl. ................................. 423/628; 423/630; 423/631
[58] Field of Search .................... 423/628, 630, 631

[56] References Cited

U.S. PATENT DOCUMENTS

| | | | |
|---|---|---|---|
| 3,207,578 | 9/1965 | Brown et al. | 423/626 |
| 3,357,791 | 12/1967 | Napier | 423/630 |
| 3,419,352 | 12/1968 | Acciarri | 423/630 |
| 3,647,374 | 3/1972 | Nomura et al. | 423/630 |

FOREIGN PATENT DOCUMENTS

| | | | |
|---|---|---|---|
| 622638 | 1/1963 | Belgium | 423/630 |
| 2209636 | 4/1973 | Fed. Rep. of Germany | 423/630 |

*Primary Examiner*—Herbert T. Carter
*Attorney, Agent, or Firm*—Cortlan R. Schupbach, Jr.

[57] ABSTRACT

Alumina having a low loose bulk density is obtained by hydrolyzing aluminum alkoxides with water in the presence of lithium hydroxide or lithium salts yielding lithium ions. The amount of density reduction is proportional to the amount of lithium ion present.

5 Claims, 1 Drawing Figure

PRODUCTION OF LOW LOOSE BULK DENSITY ALUMINA

This invention relates to a method for producing low loose bulk density alumina. More particularly, this invention relates to a method for providing alumina having low loose bulk density by hydrolyzing aluminum alkoxides with water in the presence of lithium ions.

Numerous processes such as the water hydrolysis of aluminum alkoxides, the alum process and sodium aluminate processes are known for the production of alumina. Such alumina has a variety of uses such as for catalysts, catalyst supports, and the like. In many of these applications the usefulness of the alumina is directly related to its pore volume, surface area, and bulk density. Generally, lighter alumina having low bulk density, high surface area and high porosity is more desirable for most processes. Most processes known heretofore produce alumina having loose bulk density greater than about 35 pounds per cubic foot (560 grams per liter), although some processes have produced lighter alumina.

Lighter alumina is desirable for use as catalysts, catalyst supports, and the like, and for such uses typically alumina having lower bulk densities, is more useful than other aluminas since less alumina weight need be placed in a reactor. The lighter alumina also has a better diffusion rate and generally is more amenable to supporting desirable catalytic metals.

The instant invention is a simple and effective method for lowering the loose bulk density of aluminas while retaining other desirable properties. The method comprises hydrolyzing aluminum alkoxides with water containing sufficient amounts of lithium ions to lower loose bulk density to the extent desired. The concentration of lithium ions has a direct effect upon the amount bulk density is reduced until bulk density is lowered to the maximum amount. It has also been discovered that ammonia used in conjunction with the lithium-containing hydrolysis water is effective in still further lowering loose bulk density.

Lithium-containing alumina is known in the art. For example, a publication of the Aluminum Company of America, Alumina Properties Technical Paper No. 10, second revision, page 19 shows that zeta alumina can be prepared by adding 2% lithium oxide at 1700° C. to alpha alumina, lithium ions occupying vacant lattice sites of a spinel lattice. U.S. Pat. No. 3,207,578 prepares alumina by hydrolysis in the presence of alkali metal salts. The reference, however, deals in making a water dispersible fibrous alumina monohydrate instead of the aluminum trihydrate of the instant invention, the aluminum trihydrate having the desired low density. The starting materials of this reference are basic aluminum acetate, and lithium used as a dispersability promoter and equated to other ions such as sodium and potassium as equal in effect. In contrast, in the instant invention, aluminum alkoxides are the starting material and lithium is used as a bulk density reducer. Other ions such as potassium and sodium have not been found effective to reduce bulk density.

The aluminum alkoxides of the instant invention can be obtained from any source such as the Ziegler process. Once obtained, the aluminum alkoxides are simply hydrolyzed to produce alumina and alcohols. The loose bulk density of the alumina is determined by pouring alumina powder through a funnel into a graduated cylinder, taking care not to move or vibrate the cylinder. The volume of the alumina is determined, and the alumina is weighed. Bulk density is determined by dividing the volume in cubic centimeters by the weight in grams.

In carrying out the process of the instant invention, the lithium ions can be provided to the hydrolysis water either by lithium hydroxide or lithium salts which give lithium ions. Any material yielding free lithium ions to the hydrolysis water without a cation detrimental to the end use of the alumina can be used.

It is preferred that ammonia be used in conjunction with lithium ions in the hydrolysis water since ammonia will enhance the alcohol/slurry interface for subsequent separations and will yet further lower the loose bulk density of the alumina obtained.

Normally, lithium ions are present in the hydrolysis water in a concentration of at least 0.06% by weight (based on total weight of lithium hydroxide added to hydrolysis water). However, lithium ion concentrations can range up to 1% by weight.

The lithium will be obtained from a material selected from the group consisting of lithium hydroxide, lithium carbonate, lithium acetate, lithium formate, lithium nitrate, lithium bicarbonate, and other lithium salts which do not leave detrimental ions behind in the alumina during subsequent treatment.

Lithium ion concentration in the dried but uncalcined alumina will usually range from about 700 parts per million to about 15,000 parts per million. Such a range is obtained by having from about 0.04 to about 0.08% lithium ions (as lithium hydroxide by weight) in the hydrolysis water. Use of a stoichiometric excess of hydrolysis water to hydrolyze the aluminum alkoxide yields alumina powder having this range of lithium in the aluminum powder.

It has also been discovered that some methods of subsequent treatment can yet further lower the loose bulk density of the alumina obtained. Lithium entrapped in the crystalline matrix of the alumina will not be removed, but lithium which is not bound (free lithium) can be removed from the alumina with the proper treatment. For example, a filtering step prior to drying, such as in a rotary kiln dryer, will remove most free lithium, giving a lower loose bulk density alumina. Thus, spray drying may not be the preferred method of drying lithium-hydrolyzed alumina to obtain the lowest loose bulk density. If filtering is carried out prior to spray drying, a spray dryer can be used. In addition, other methods of removing unbound lithium, such as by centrifuging instead of filtering, can be used.

The instant invention is more concretely described with reference to the examples below wherein all parts and percentages are by weight unless otherwise specified. The examples are provided to illustrate the instant invention and not to limit it.

EXAMPLE 1

One liter of water containing 0.3% lithium hydroxide by weight was heated to 180° F. in a 3-neck flask. One liter of aluminum alkoxide was added to the water and the resulting mixture agitated at 180° F. for 10 minutes. Alcohols formed were decanted from the mixture. Remaining alcohols were then extracted from the alumina with butanol in two extraction steps at 180° F. Butanol was distilled overhead. The retained alumina was filtered and dried overnight at 250° F. The resulting alumina powder was crushed, ground, and tested for low loose bulk density. The alumina had a loose bulk density of 284 grams per liter. After calcining the powder at 900° F. for three hours, the alumina had a surface area of 370 square meters per gram.

EXAMPLE 2

The procedure of Example 1 was exactly repeated except that the hydrolysis water contained 1.4% lithium hydroxide and 0.25% ammonia by weight. The resulting powder density was 285 grams per liter, and the calcined powder had a surface area of 385 square meters per gram.

EXAMPLE 3

The procedure of Example 1 was exactly repeated except that the water contained 0.41% lithium nitrate and no ammonia. The resulting powder density was 294 grams per liter, and the calcined powder had a surface area of 362 square meters per gram.

EXAMPLE 4

The experiment was carried out exactly the same as in Example 1 except that the hydrolysis water contained 0.44% lithium carbonate and no ammonia. The resulting powder density was 396 grams per liter, and the calcined powder had a surface area of 310 square meters per gram.

alumina and that higher concentrations of lithium reduce the density yet further. The graph also shows that some lithium salts are more effective than others. The addition of ammonia is shown to enhance the density reduction caused by the lithium ions.

The experimental procedure described in Examples 1 through 6 was carried out except that lithium hydroxide was added after hydrolysis was complete. The lithium ion did not reduce the bulk density when not present during the hydrolysis reaction. Test results are shown in Table I, examples 20 and 21.

Examples 7 through 22 were carried out using varying amounts of lithium hydroxide, lithium carbonate, and lithium nitrate, as well as ammonia alone to show the various effects of the addition of these materials. The experimental procedure was the same as that described for Examples 1 through 6. The results are shown in Table 1 wherein RXN shows the phase split after hydrolysis, EXT1 shows after the first butanol addition, and EXT2 after the second butanol addition. The number 1 indicates no phase split, while the number 10 indicates an exceptionally good phase split. The surface area in square meters per gram was determined with the nitrogen desorption technique. Loose bulk density was determined as previously described.

TABLE I

| Test | Compound | Moles Cmpd. | Wt% | ADDITIVES | Wt% | pH | Phase Splitting RXN After Hydrolysis | EXT1 | EXT2 | Loose Bulk Density lb/ft³ | gm/ml | % $Al_2O_3$ | % Carbon | Surface Area m²/gm |
|---|---|---|---|---|---|---|---|---|---|---|---|---|---|---|
| 7  | LiOH . H₂O  | .0310 | .13  | —       | —   | +11. | 5 | 9 | 7 | 24.3 | .3898 | 63.8 | 2.77 | 388.0 |
| 8  | LiOH . H₂O  | .0595 | .25  | —       | —   | +11. | 4 | 9 | 9 | 19.2 | .3075 | 64.7 | 1.14 | 406.4 |
| 9  | LiOH . H₂O  | .1190 | .50  | —       | —   | +11. | 3 | 6 | 8 | 17.0 | .2721 | 62.5 | 2.20 | 381.5 |
| 10 | LiOH . H₂O  | .2405 | 1.00 | —       | —   | +11. | 6 | 8 | 8 | 14.7 | .2347 | 61.0 | .72  | 262.8 |
| 11 | LiOH . H₂O  | .4859 | 2.00 | —       | —   | +11. | 7 | 6 | 8 | 12.6 | .2012 | 56.2 | 1.38 | 132.3 |
| 12 | LiOH . H₂O  | .0071 | .03  | NH₃     | .28 | +11. | 8 | 7 | 7 | 38.3 | .6142 | 69.3 | 3.33 | 336.7 |
| 13 | LiOH . H₂O  | .0143 | .06  | NH₃     | .25 | +11. | 4 | 9 | 7 | 30.8 | .4940 | 66.5 | 2.07 | 388.5 |
| 14 | LiOH . H₂O  | .0310 | .13  | NH₃     | .25 | +11. | 4 | 9 | 8 | 23.2 | .3717 | 65.5 | .83  | 388.7 |
| 15 | LiOH . H₂O  | .0595 | .25  | NH₃     | .25 | +11. | 3 | 7 | 8 | 17.8 | .2851 | 65.3 | .63  | 385.0 |
| 16 | LiOH . H₂O  | .0595 | .25  | NCOOH   | .27 | +11. | 3 | 8 | 8 | 15.5 | .2488 | 63.9 | 1.53 | 397.2 |
| 17 | LiOH . H₂O  | .0595 | .25  | CH₃COOH | .25 | +11. | 8 | 8 | 6 | 14.5 | .2325 | 64.7 | .63  | 399.0 |
| 18 | LiNO₃       | .0596 | .41  | —       | —   | 4.5  | 9 | 6 | 7 | 18.3 | .2924 | 65.4 | .80  | 361.9 |
| 19 | Li₂CO₃      | .0595 | .44  | —       | —   | +11. | 8 | 7 | 7 | 23.0 | .3687 | 64.8 | 1.38 | 309.9 |
| 20 | NH₃         | .1409 | .24  | LiOH . H₂O | .24 | +11. | 8 | 6 | 6 | 37.9 | .6071 | 72.2 | 4.0  | 249.4 |
| 21 | NH₃         | .1468 | .25  | LiOH . H₂O | .25 | 10   | 8 | 8 | 6 | 38.5 | .6173 | 72.1 | 5.46 | 302.6 |
| 22 | NH₃         | .235  | .40  | —       | —   | +11. | 9 | 8 | 8 | 38.4 | —     | 75.9 | 1.91 | —     | per gram.

EXAMPLE 5

The example was carried out exactly as described in Example 1 except that hydrolysis was contained 0.14% lithium hydroxide and 0.25% acetic acid. The resulting powder density was 232 grams per liter, and the calcined powder had a surface area of 399 square meters per gram.

EXAMPLE 6

The experiment was carried out exactly as described in Example 1 except that the hydrolysis water contained 0.14% lithium hydroxide and 0.27% formic acid. The resulting powder density was 249 grams per liter and the calcined powder had a surface area of 397 square meters per gram.

FIG. 1 is a plot of the ratio of lithium ions added to alumina content of the alkoxide added vs the loose bulk density obtained. The graph shows all data in the foregoing examples together with data from other examples carried out in exactly the same manner. FIG. 1 clearly shows that lithium ions reduce the bulk density of the In order to determine the effect of various techniques of drying alumina which had been obtained from the hydrolysis of aluminum alkoxides using water containing lithium ions, some tests were carried out in order to determine the effect of various techniques.

EXAMPLE 23

Spray dried powder from an hydrolysis of aluminum alkoxide hydrolyzed in the presence of lithium ions (200 grams) was added to 400 grams of water at 140° F. The mixture was stirred for 5 minutes and the slurry was then dried at 250° F. The dried cake was ground and had a bulk density of 540 grams per liter.

EXAMPLE 24

An experiment was carried out in the same manners as described in Example 23 except that the slurry was filtered prior to drying. The bulk density of the alumina obtained was 496 grams per liter.

EXAMPLE 25

A third experiment was carried out as described in Example 23 except that the filtercake was rewetted and filtered a second time prior to drying. Determination of loose bulk density showed the alumina had a bulk density of 466 grams per liter.

It is therefore clear that the excess lithium not bound in the crystal alumina matrix can be removed by any one of several methods, or a combination of these.

While certain embodiments and details have been shown for the purpose of illustrating this invention, it will be apparent to those skilled in this art that various changes and modifications may be made herein without departing from the spirit or scope of the invention.

We claim:

1. A method for lowering loose bulk density of alumina obtained from the water hydrolysis of aluminum alkoxide comprising hydrolyzing said aluminum alkoxides by contacting with water containing lithium ions in a concentration of at least 0.06 percent by weight based on the weight of hydrolysis water to obtain alumina and alcohols, removing the alcohols, recovering aluminum trihydrate having a lithium ion content of from about 700 parts per million to about 15,000 parts per million when determined as a dry uncalcined powder and drying said aluminum trihydrate.

2. A method as described in claim 1 wherein the lithium ions are provided in the hydrolysis water by lithium hydroxide or lithium salts which yield lithium ions while providing no undesirable anions to the solution.

3. A method as described in claim 2 wherein ammonia is used in conjunction with lithium ions in the hydrolysis water.

4. A method as described in claim 2 wherein the lithium donating materials are selected from the group consisting of lithium hydroxide, lithium carbonate, lithium hydrocarbonate, lithium acetate, lithium formate, lithium nitrate.

5. A method as described in claim 2 wherein the free lithium is removed from the produced alumina by filtering prior to drying.

* * * * *